United States Patent

Jang et al.

[11] Patent Number: 5,959,674
[45] Date of Patent: Sep. 28, 1999

[54] PREDICTION METHOD FOR DISCRETE COSINE TRANSFORM COEFFICIENTS

[75] Inventors: Euee-seon Jang, Sungnam; Dae-sung Cho, Seoul, both of Rep. of Korea

[73] Assignee: Samsung Electronics Co., Ltd., Suwon, Rep. of Korea

[21] Appl. No.: 08/933,900

[22] Filed: Sep. 19, 1997

[30] Foreign Application Priority Data

Sep. 21, 1996 [KR] Rep. of Korea ........................ 96-41504

[51] Int. Cl.$^6$ ............................. H04N 7/12; H04N 11/02; H04N 11/04
[52] U.S. Cl. .......................... 348/403; 348/405; 348/410; 348/421
[58] Field of Search ..................................... 348/421, 404, 348/405, 403, 408, 410, 420; H04N 7/12, 11/02, 11/04

[56] References Cited

U.S. PATENT DOCUMENTS

| | | | |
|---|---|---|---|
| 5,543,843 | 8/1996 | Kato et al. | 348/421 |
| 5,559,557 | 9/1996 | Kato | 348/405 |
| 5,835,149 | 11/1998 | Astle | 348/419 |

*Primary Examiner*—Bryan Tung
*Assistant Examiner*—Nhon T. Diep
*Attorney, Agent, or Firm*—Burns, Doane, Swecker & Mathis, L.L.P.

[57] ABSTRACT

A method for prediction a discrete cosine transform (DCT) coefficient is provided. In the prediction method, DC coefficients of adjacent blocks are used. For selecting a DC coefficient to be used for the prediction, the maximum and the minimum among the DC coefficients of the adjacent blocks are selected, and then the maximum or minimum value which is closest to the current DC coefficient is used for the prediction value for the current block. Therefore, prediction performance for DC/AC coefficients can be improved in a DCT domain.

2 Claims, 3 Drawing Sheets

PREDICTION METHOD FOR DISCRETE COSINE TRANSFORM COEFFICIENTS

BACKGROUND OF THE INVENTION

The present invention relates to a video signal encoding/decoding method, and more particularly, to a prediction method for discrete cosine transform coefficients, for predicting a DC coefficient using the maximum and minimum values of adjacent blocks.

A discrete cosine encoder encodes without loss a DC coefficient which is a coefficient obtained after quantization. Here, the DC prediction in a discrete cosine transform domain is to predict DC coefficients among adjacent blocks. A lossless encoder/decoder using the prediction of DC coefficients obtained after discrete cosine transform (DCT) quantization is shown in FIG. 3.

FIG. 1 is a diagram illustrating a conventional DC coefficient prediction method. Suppose that macroblocks 101, 102 and 103 are encoded in sequence, and the DC coefficient of the first block of the macroblock 101 is predicted based on an initial value 128. Within the macroblock, the DC coefficients are zigzag predicted along the direction 105. After the encoding on the final block of one macroblock is completed, the value is used for predicting a DC coefficient of the first block of the next macroblock. If the third block 106 of the macro block 102 does not require encoding, the third block 106 is skipped for the prediction of the DC coefficient of the next block. This skipping is also applied to blocks 107, 108 and 109 of the macroblock 103. A resultant DC coefficient 110 obtained after coding the macroblocks 101, 102 and 103 is used for the prediction of a DC coefficient of the first block of the subsequent macroblock.

That is, according to the conventional DC coefficient prediction method, if the coding is performed in a macroblock unit including 16×16 blocks having four 8×8 blocks, the DC prediction is performed in the zigzag direction by using the previous one DC coefficient. When the DCT is performed on a block, the DC coefficient represents the brightness of the block. Also, the brightness is similar among adjacent blocks. Thus, the DC coefficients are predicted based on the above characteristics, thereby improving the performance.

However, as shown in FIG. 1, the conventional DC coefficient prediction method uses only one particular DC coefficient for the prediction. However, since the scanning direction of FIG. 1 can not provide the optimum prediction all the times, the DC coefficient obtained from the scanning, used for the prediction, is not sufficient to improve the performance. Thus, a prediction algorithm which reflects the characteristic of the image is required.

SUMMARY OF THE INVENTION

It is an object of the present invention to provide a discrete cosine transform coefficient prediction method, for predicting a DC coefficient of the current block in a discrete cosine transform domain, using the maximum and minimum DC coefficients of the adjacent blocks.

To accomplish the object of the present invention, there is provided a prediction method for a discrete cosine transform (DCT) coefficient, comprising the steps of:

(a) inputting quantized DC coefficients of blocks adjacent to a current block, and the quantized DC coefficient of the current block, in a DCT domain;

(b) selecting the minimum and maximum of the quantized DC coefficients of the adjacent blocks; and (c) selecting the minimum or maximum value, whichever is the closest to the quantized DC coefficient of the current block to be a prediction value for the current block.

It is preferable that after step (b) the prediction method for a discrete cosine transform (DCT) coefficient comprises the steps of (b1) checking whether the absolute difference of the minimum and the maximum is greater than a predetermined threshold, and performing the step (c) if the absolute difference between the minimum and the maximum is greater than the threshold, and (b2) selecting an arbitrary one of the quantized DC coefficients of the adjacent blocks to be a prediction value for the current block, if the absolute difference between the minimum and the maximum is less than or equal to the threshold in the step (b1).

According to the present invention, one or more previous DC coefficients are used for prediction, in order to improve the performance of the conventional DC coefficient prediction. When the adjacent blocks are of different brightness, the DC coefficients of the adjacent blocks are also different. Particularly, a DC coefficient to be used for the prediction is selected using the fact that the current DC coefficient to be encoded is close to either the maximum or minimum value of the adjacent blocks.

The discrete cosine transform coefficient prediction method according to the present invention is used for effectively improving the performance of a conventional moving picture coding algorithm.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
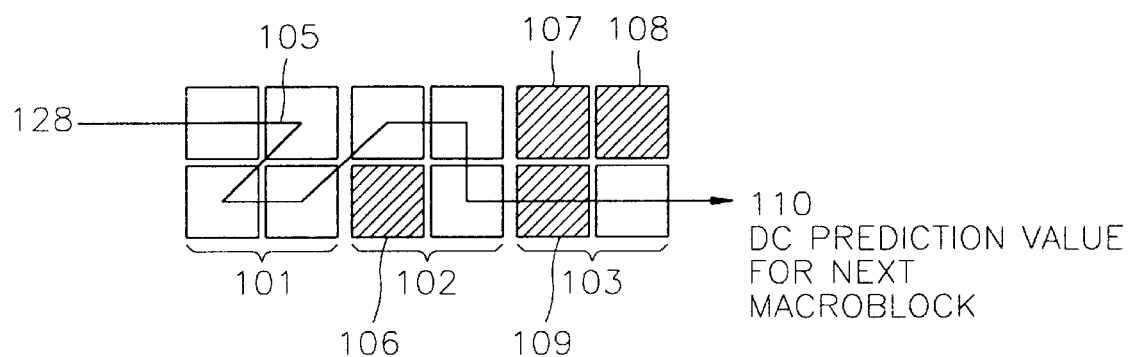
FIG. 1 is a diagram illustrating a conventional zigzag scanning method for DC coefficient prediction in a discrete cosine transform (DCT) domain.
Figure 2:
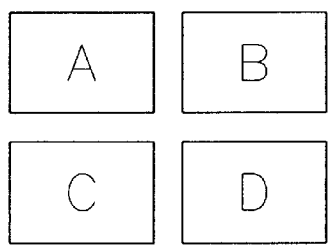
FIG. 2 is a diagram showing the current block D to be coded, and adjacent blocks A, B and C.
Figure 4:
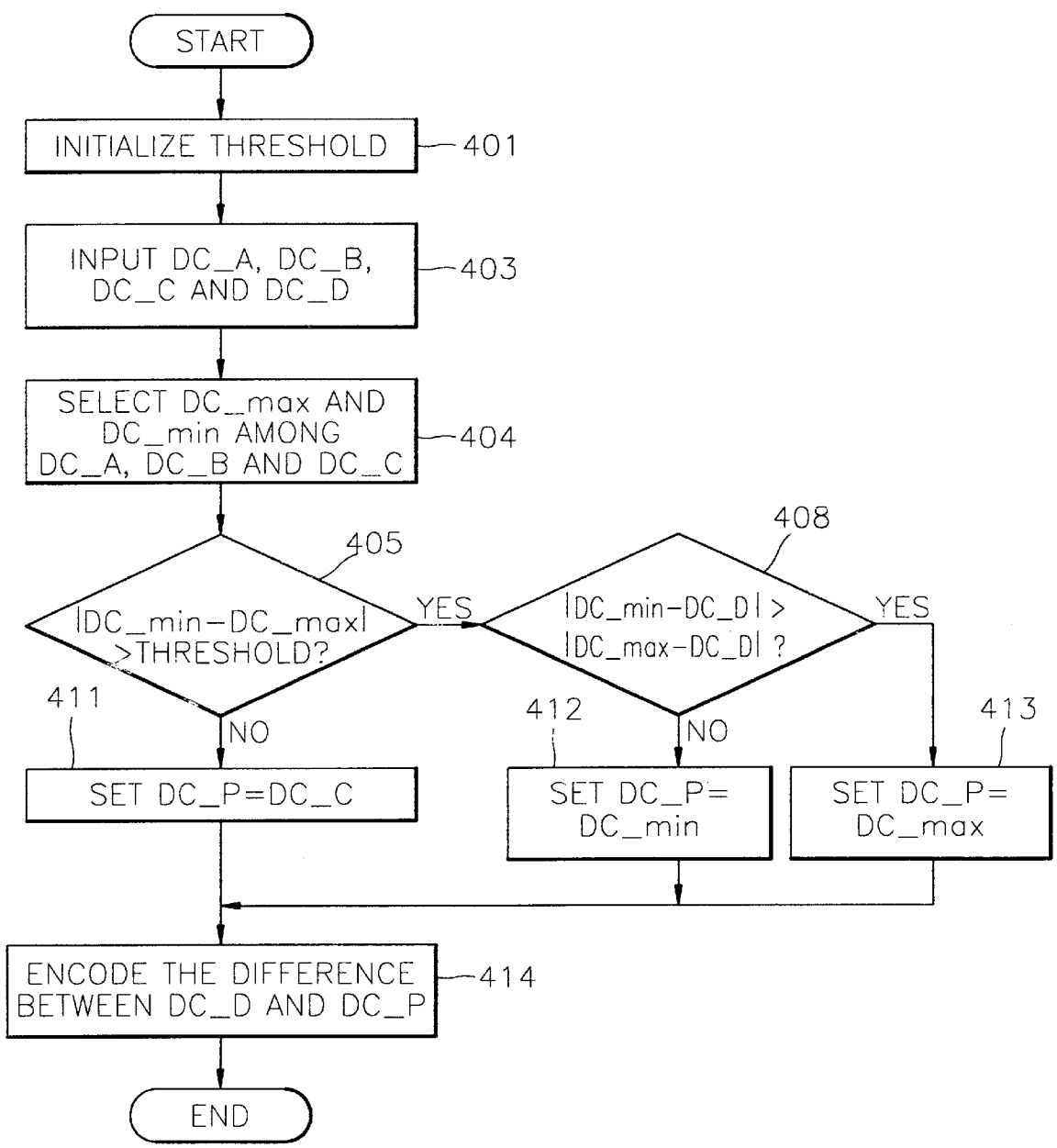
FIG. 4 is a flowchart illustrating a DCT coefficient prediction method according to the present invention.

According to the discrete cosine transform (DCT) coefficient prediction method of the present invention, DC coefficients of a plurality of adjacent blocks as shown in FIG. 2 are used. In order to select a DC coefficient to be used for the prediction, as shown in FIG. 4, the maximum and minimum DC coefficients of the adjacent blocks are selected, and then the maximum or minimum value which is closest to the current DC coefficient is used for the DC coefficient prediction. Here, an overhead bit is required for selecting the maximum and minimum values. However, in order to reduce the unnecessary overhead bits, the DC coefficient for the prediction is fixed in the case where the difference between the maximum and minimum values is less than or equal to a threshold value. The reason for this is because in an area of uniform brightness it is not necessary to select the predicton value among a plurality of DC coefficients.

FIG. 2 shows the locations of the previous blocks required for the DC coefficient prediction. In order to encode the DC coefficient of the current block D, one of the DC coefficients of blocks A, B and C is selected for prediction.

Figure 3:
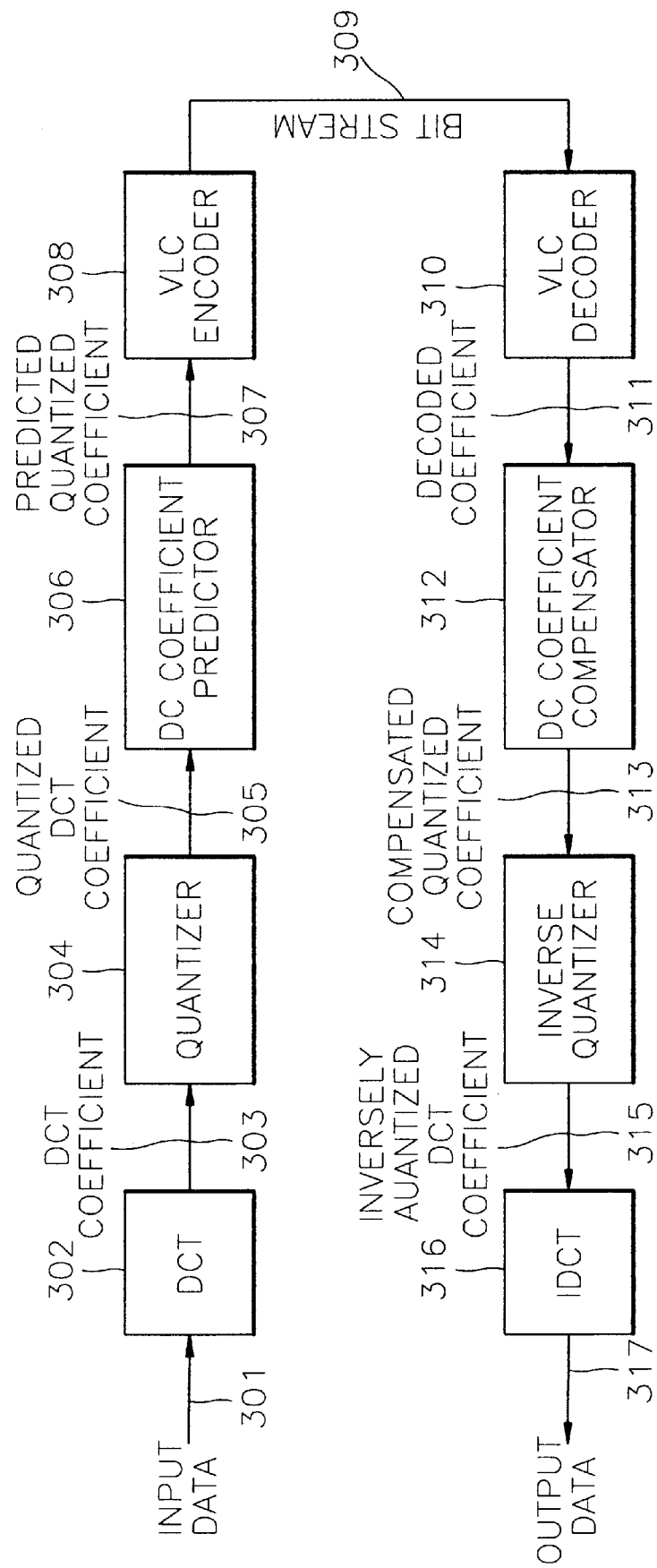
FIG. 3 is a block diagram of a lossless encoder/decoder using the DC coefficient prediction in a discrete cosine transform domain.

Generally, a lossless encoder/decoder using DC/AC coefficient prediction method has the structure as shown in FIG. 3. Input data 301 is converted into a discrete cosine transform (DCT) coefficient 303 by a discrete cosine transformer (DCT) 302. The DCT coefficient is quantized by a quantizer 304, resulting in a quantized DCT coefficient 305. The quantized DCT coefficient 305 is input to a DC coefficient predictor 306 for prediction. A predicted coefficient 307 output from the DC coefficient predictor 306 is coded by a variable length code (VLC) encoder 308. A bit stream 309 output from the VLC encoder 308 is input to a VLC decoder 310. A decoded coefficient 311 output from the VLC decoder 310 is compensated by a DC coefficient compensator 312, resulting in a compensated quantized coefficient 313. The compensated quantized coefficient 313 is inversely quantized by an inverse quantizer 314, and the obtained coefficient 315 is inversely transformed by an inverse discrete cosine transformer (IDCT), resulting in final restored data 317.

FIG. 4 is a flowchart illustrating a DCT coefficient prediction method according to the present invention.

First, a threshold value is set, which is later used to determine whether to predict DC coefficient using overhead bits or using a fixed DC coefficient (step 401). Then, the DC coefficients of the blocks A, B and C, and the current block D, that is, DC_A, DC_B, DC_C and DC_D which have passed the DCT and quantization, are input (step 403). Then, the maximum (DC_max) and minimum (DC_min) values among DC_A, DC_B and DC C are selected (step 404). Then, the absolute difference between the minimum and maximum is calculated, and the absolute difference and the threshold are compared (step 405). If the absolute difference is greater than the threshold, the absolute difference between the DC coefficient of the current block and the minimum value DC_min, and the absolute difference between the DC coefficient of the current block and the maximum value DC_max, are compared to determine whether the current DC coefficient is closer to the minimum value or the maximum value (step 408). If the current DC coefficient is closer to the maximum value DC_max, then the maximum value DC_max is selected as the current prediction value (DC_P). If the current DC coefficient is closer to the minimum value DC_mini, then the minimum value DC_mini is selected as the current prediction value (DC_P). If the absolute difference between the maximum and minimum values is less than or equal to the threshold, in step 405, it means that the data characteristic is uniform. Thus, any one of DC_A, DC_B or DC_C may be selected as the DC prediction value without causing a big difference. Here, DC_C of the block C is used as the DC prediction value DC_P in step 411. Once the DC prediction value has been set, the difference between the prediction value and the current DC coefficient is used for an encoding in step 414.

As described above, according to the DCT coefficient prediction method, the maximum or minimum of the DC coefficient of the blocks adjacent to the current block is used for the prediction of the current DC coefficient, thereby improving performance in the prediction of the DC/AC coefficients.

What is claimed is:

1. A prediction method for a discrete cosine transform (DCT) coefficient, comprising the steps of:

(a) inputting quantized DC coefficients of blocks adjacent to a current block, and the quantized DC coefficient of the current block, in a DCT domain;

(b) selecting the minimum and maximum of the quantized DC coefficients of the adjacent blocks; and (c) selecting the minimum or maximum value, whichever is the closest to the quantized DC coefficient of the current block to be a prediction value for the current block.

2. The prediction method of claim 1, further comprising, after step (b), the steps of:

(b1) checking whether the absolute difference of the minimum and the maximum is greater than a predetermined threshold, and performing the step (c) if the absolute difference between the minimum and the maximum is greater than the threshold; and (b2) selecting an arbitrary one of the quantized DC coefficients of the adjacent blocks to be a prediction value for the current block, if the absolute difference between the minimum and the maximum is less than or equal to the threshold in the step (b1).

* * * * *